(12) United States Patent
Crilly, Jr.

(10) Patent No.: US 8,161,528 B2
(45) Date of Patent: Apr. 17, 2012

(54) DETECTING WIRELESS INTERLOPERS

(75) Inventor: William J. Crilly, Jr., Liberty Lake, WA (US)

(73) Assignee: XR Communications, LLC, New York, NY (US)

( * ) Notice: Subject to any disclaimer, the term of this patent is extended or adjusted under 35 U.S.C. 154(b) by 1584 days.

(21) Appl. No.: 10/680,965

(22) Filed: Oct. 7, 2003

(65) Prior Publication Data

US 2005/0075070 A1    Apr. 7, 2005

(51) Int. Cl.
*G08B 23/00* (2006.01)
*H04M 3/16* (2006.01)

(52) U.S. Cl. ............... 726/3; 726/23; 455/410

(58) Field of Classification Search .......... 726/23, 726/3
See application file for complete search history.

(56) References Cited

U.S. PATENT DOCUMENTS

| | | | | |
|---|---|---|---|---|
| 6,327,550 B1 * | 12/2001 | Vinberg et al. | | 702/186 |
| 6,405,318 B1 * | 6/2002 | Rowland | | 726/22 |
| 6,910,135 B1 * | 6/2005 | Grainger | | 726/23 |
| 7,295,831 B2 * | 11/2007 | Coleman et al. | | 455/410 |
| 7,308,714 B2 * | 12/2007 | Bardsley et al. | | 726/23 |
| 7,778,606 B2 * | 8/2010 | Ammon et al. | | 455/67.11 |
| 2003/0135762 A1 * | 7/2003 | Macaulay | | 713/201 |
| 2003/0188190 A1 * | 10/2003 | Aaron et al. | | 713/201 |
| 2003/0237000 A1 * | 12/2003 | Denton et al. | | 713/201 |
| 2004/0098617 A1 * | 5/2004 | Sekar | | 713/201 |
| 2004/0250124 A1 * | 12/2004 | Chesla et al. | | 713/201 |
| 2004/0252837 A1 * | 12/2004 | Harvey et al. | | 380/270 |

* cited by examiner

*Primary Examiner* — William Powers
(74) *Attorney, Agent, or Firm* — Mintz, Levin, Cohn, Ferris, Glovsky and Popeo, P.C.

(57) ABSTRACT

In an exemplary apparatus implementation, an apparatus includes: at least one processor; and one or more media including processor-executable instructions that are capable of being executed by the at least one processor, the processor-executable instructions adapted to direct the apparatus to perform actions including: monitoring at least one signal characteristic for multiple signals that relate to a single source address; and detecting a wireless interloper if a discrepancy is determined to exist with regard to the monitored at least one signal characteristic for the multiple signals. In an exemplary access station implementation, an access station is capable of ascertaining at least one signal characteristic for multiple signals, is configured to detect a wireless interloper with regard to a particular address by analyzing the ascertained at least one signal characteristic for the multiple signals, and is adapted to counter the detected wireless interloper.

9 Claims, 8 Drawing Sheets

DETECTING WIRELESS INTERLOPERS

TECHNICAL FIELD

This disclosure relates in general to address-based wireless communications and in particular, by way of example but not limitation, to detecting and countering interlopers in an address-based wireless communications environment.

BACKGROUND

So-called local area networks (LANs) have been proliferating to facilitate communication since the 1970s. Certain LANs (e.g., those operating in accordance with IEEE 802.3) have provided enhanced electronic communication through wired media for decades. Since the late 1990s, LANs have expanded into wireless media so that networks may be established without necessitating wire connections between or among various network elements. Such LANs may operate in accordance with IEEE 802.11 (e.g., 802.11(a), (b), (e), (g), etc.) or other wireless network standards.

Although standard LAN protocols, such as Ethernet, may operate at fairly high speeds with inexpensive connection hardware and may bring digital networking to almost any computer, wireless LANs can often achieve the same results more quickly, more easily, and/or at a lower cost. Furthermore, wireless LANs provide increased mobility, flexibility, and spontaneity when setting up a network for two or more devices. However, wireless networks present new and different security issues due to their ability to be accessed without physical wires and due to the general openness of wireless media. For example, wireless LANs are subject to so-called man-in-the-middle (MITM) attacks.

In wireless communication generally, signals are sent from a transmitter to a receiver in the form of packets (e.g., for digital wireless communications). A packet that is traveling from a transmitter to a receiver is vulnerable to interception by a MITM. When packets are intercepted, the MITM can maliciously interfere with the wireless communication to the detriment of the transmitter and/or receiver.

Accordingly, there is a need for schemes and/or techniques to detect and/or counter MITM attacks.

SUMMARY

In an exemplary apparatus implementation, an apparatus includes: at least one processor; and one or more media including processor-executable instructions that are capable of being executed by the at least one processor, the processor-executable instructions adapted to direct the apparatus to perform actions including: monitoring at least one signal characteristic for multiple signals that relate to a single source address; and detecting a wireless interloper if a discrepancy is determined to exist with regard to the monitored at least one signal characteristic for the multiple signals.

In an exemplary access station implementation, an access station is capable of ascertaining at least one signal characteristic for multiple signals, is configured to detect a wireless interloper with regard to a particular address by analyzing the ascertained at least one signal characteristic for the multiple signals, and is adapted to counter the detected wireless interloper.

In an exemplary method implementation, a method includes the actions of: ascertaining multiple respective values for at least one signal characteristic for multiple respective packets, each packet of the multiple respective packets corresponding to a particular source address; and determining if the multiple respective packets originate from more than one source responsive to the multiple respective values.

In another exemplary apparatus implementation, an apparatus includes: at least one processor; and one or more media including processor-executable instructions that are capable of being executed by the at least one processor, the processor-executable instructions adapted to direct the apparatus to perform actions including: ascertaining at least one characteristic for a packet having a particular address; logging the at least one characteristic for the packet in association with the particular address; determining if a bi-modal distribution exists with regard to the particular address; and if a bi-modal distribution is determined to exist, detecting an interloper with regard to the particular address.

In yet another exemplary apparatus implementation, an apparatus includes: a signal characteristic ascertainer that is capable of ascertaining values for at least one signal characteristic for received packets having a particular source address; and a discrepancy detector that is adapted to detect a discrepancy among the ascertained values for the at least one signal characteristic for the received packets having the particular source address so as to detect a wireless interloper with regard to the particular source address.

Other method, system, apparatus, access station, wireless receiver, media, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
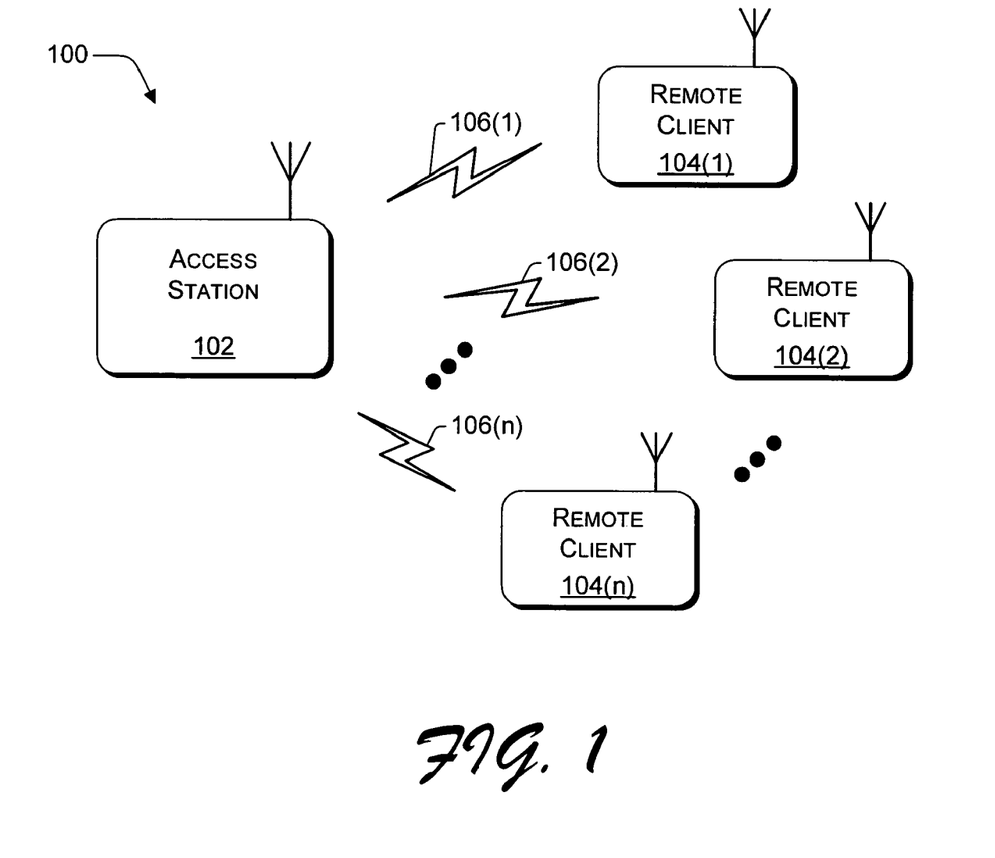
FIG. 1 is an exemplary general wireless communications environment that includes an access station, multiple remote clients, and multiple communication links.

FIG. 1 is an exemplary general wireless communications environment 100 that includes an access station 102, multiple remote clients 104, and multiple communication links 106. Wireless communications environment 100 is representative generally of many different types of wireless communications environments, including but not limited to those pertaining to wireless local area networks (LANs) or wide area networks (WANs) (e.g., Wi-Fi) technology, cellular technology, trunking technology, and so forth. In wireless communications environment 100, access station 102 is in wireless communication with remote clients 104(1), 104(2) ... 104(n) via wireless communications or communication links 106(1), 106(2) ... 106(n), respectively. Although not required, access station 102 is typically fixed, and remote clients 104 are typically mobile. Also, although only three remote clients 104 are shown, access station 102 may be in wireless communication with many such remote clients 104.

With respect to a so-called Wi-Fi wireless communications system, for example, access station 102 and/or remote clients 104 may operate in accordance with any IEEE 802.11 or similar standard. With respect to a cellular system, for example, access station 102 and/or remote clients 104 may operate in accordance with any analog or digital standard, including but not limited to those using time division/demand multiple access (TDMA), code division multiple access (CDMA), spread spectrum, some combination thereof, or any other such technology.

Access station 102 may be, for example, a nexus point, a trunking radio, a base station, a Wi-Fi switch, an access point, some combination and/or derivative thereof, and so forth. Remote clients 104 may be, for example, a hand-held device, a desktop or laptop computer, an expansion card or similar that is coupled to a desktop or laptop computer, a personal digital assistant (PDA), a mobile phone, a vehicle having a wireless communication device, a tablet or hand/palm-sized computer, a portable inventory-related scanning device, any device capable of processing generally, some combination thereof, and so forth. Remote clients 104 may operate in accordance with any standardized and/or specialized technology that is compatible with the operation of access station 102.

Figure 2:
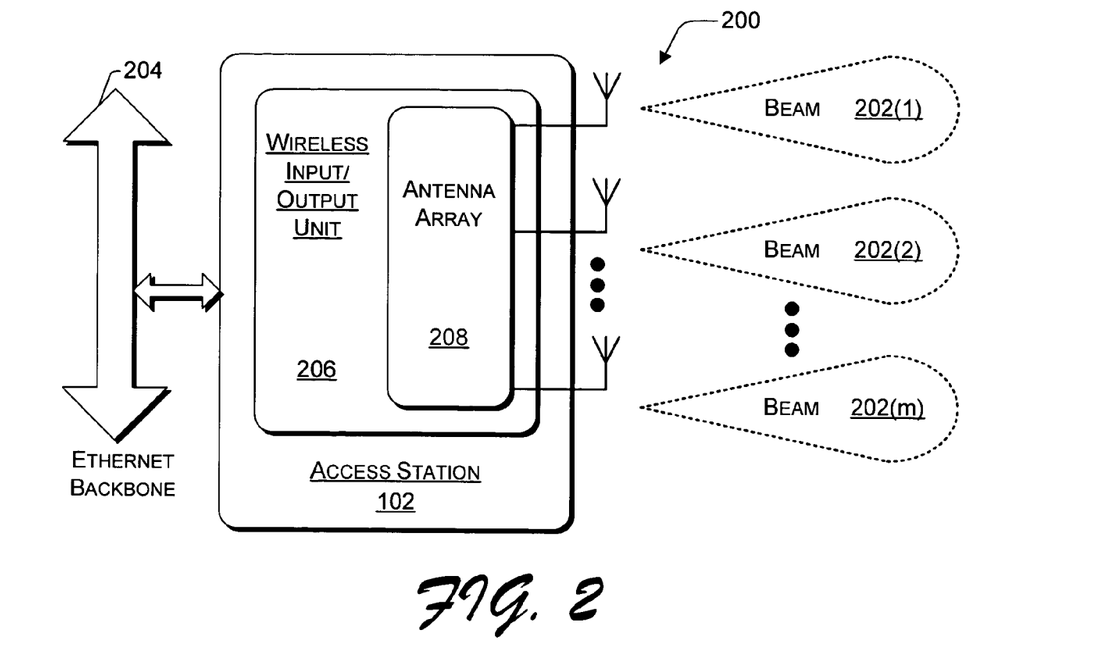
FIG. 2 is an exemplary wireless LAN/WAN communications environment that includes an access station, a wireless input/output (I/O) unit, an antenna array, and multiple communication beams.

FIG. 2 is an exemplary wireless LAN/WAN communications environment 200 that includes an access station 102, a wireless input/output (I/O) unit 206, an antenna array 208, and multiple communication beams 202. Wireless LAN/WAN communications environment 200 may operate in accordance with, for example, a Wi-Fi-compatible or similar standard. Thus, in such an implementation, exemplary access station 102 may operate in accordance with a Wi-Fi-compatible or similar standard. Access station 102 is coupled to an Ethernet backbone 204. Access station 102 (of FIG. 2) may be considered a Wi-Fi switch, especially because it is illustrated as being directly coupled to Ethernet backbone 204 without an intervening external Ethernet router or switch.

Access station 102 includes wireless I/O unit 206. Wireless I/O unit 206 includes an antenna array 208 that is implemented as two or more antennas, and optionally as a phased array of antennas and/or as a so-called smart antenna. Wireless I/O unit 206 is capable of transmitting and/or receiving (i.e., transceiving) signals (e.g., wireless communication(s) 106 (of FIG. 1)) via antenna array 208. These wireless communication(s) 106 are transmitted to and received from (i.e., transceived with respect to) a remote client 104 (also of FIG. 1). These signals may be transceived directionally with respect to one or more particular communication beams 202.

In wireless communication, signals may be sent from a transmitter to a receiver using electromagnetic waves that emanate from one or more antennas as focused in one or more desired directions, which contrasts with omni-directional transmission. When the electromagnetic waves are focused in a desired direction, the pattern formed by the electromagnetic wave is termed a "beam" or "beam pattern." The production and/or application of such electromagnetic beams is typically referred to as "beamforming."

Beamforming may provide a number of benefits such as greater range and/or coverage per unit of transmitted power, improved resistance to interference, increased immunity to the deleterious effects of multipath transmission signals, and so forth. Beamforming can be achieved using any of a number of active and passive beamformers (not explicitly shown). Examples of such active and passive beamformers include a tuned vector modulator (multiplier), a Butler matrix, a Rotman or other lens, a canonical beamformer, a lumped-element beamformer with static or variable inductors and capacitors, and so forth. Alternatively, communication beams 202 may be formed using full adaptive beamforming.

By using such a beamformer along with antenna array 208, multiple communication beams 202(1), 202(2) ... 202(m) may be produced by wireless I/O unit 206. Although three beams 202(1, 2, m) are illustrated with three antennas of antenna array 208, it should be understood that the multiple antennas of antenna array 208 work in conjunction with each other to produce the multiple beams 202(1, 2 ... m). An exemplary set of communication beam patterns is described below with reference to FIG. 3.

Figure 3:
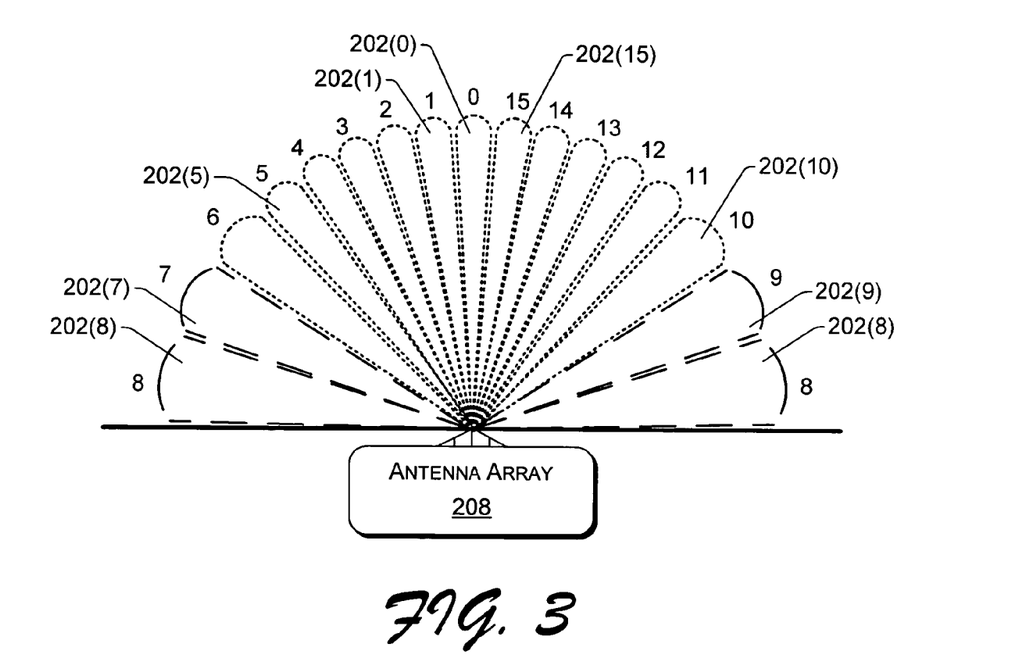
FIG. 3 illustrates an exemplary set of communication beams that emanate from an antenna array as shown in FIG. 2.

FIG. 3 illustrates an exemplary set of communication beams 202 that emanate from an antenna array 208 as shown in FIG. 2. In a described implementation, antenna array 208 includes sixteen antennas 208(0, 1 ... 14, and 15) (not explicitly shown in FIG. 2). From the sixteen antennas 208(0 ... 15), sixteen different communication beams 202(0), 202(1) ... 202(14), and 202(15) are formed as the wireless signals emanating from antennas 208 add and subtract from each other during electromagnetic propagation.

Communication beams 202(1) ... 202(15) spread out symmetrically from the central communication beam 202(0). The narrowest beam is the central beam 202(0), and the beams become wider as they spread outward from the center. For example, beam 202(15) is slightly wider than beam 202(0), and beam 202(5) is wider than beam 202(15). Also, beam 202(10) is wider still than beam 202(5). It should be understood that the set of communication beam patterns illustrated in FIG. 3 are exemplary only and that other communication beam pattern sets may differ in width, shape, number, angular coverage, and so forth.

Due to real-world effects of the interactions between and among the wireless signals as they emanate from antenna array 208 (e.g., assuming a linear antenna array in a described implementation), communication beam 202(8) is degenerate such that its beam pattern is formed on both sides of antenna array 208. These real-world effects also account for the increasing widths of the other beams 202(1 ... 7) and 202(15 ... 9) as they spread outward from central beam 202(0).

In fact, in a described implementation, communication beams 202(7) and 202(9) are too wide for efficient and productive use. Hence, communication beams 202(7), 202(8), and 202(9) are not utilized in a described implementation; in other words, such an implementation utilizes thirteen communication beams 202 (e.g., beams 202(0 ... 6) and beams 202(10 ... 15)). In an alternative implementation, six of eight communication beams 202(0 ... 8) emanating from an antenna array 208 that has eight antenna elements may be utilized.

Figure 4:
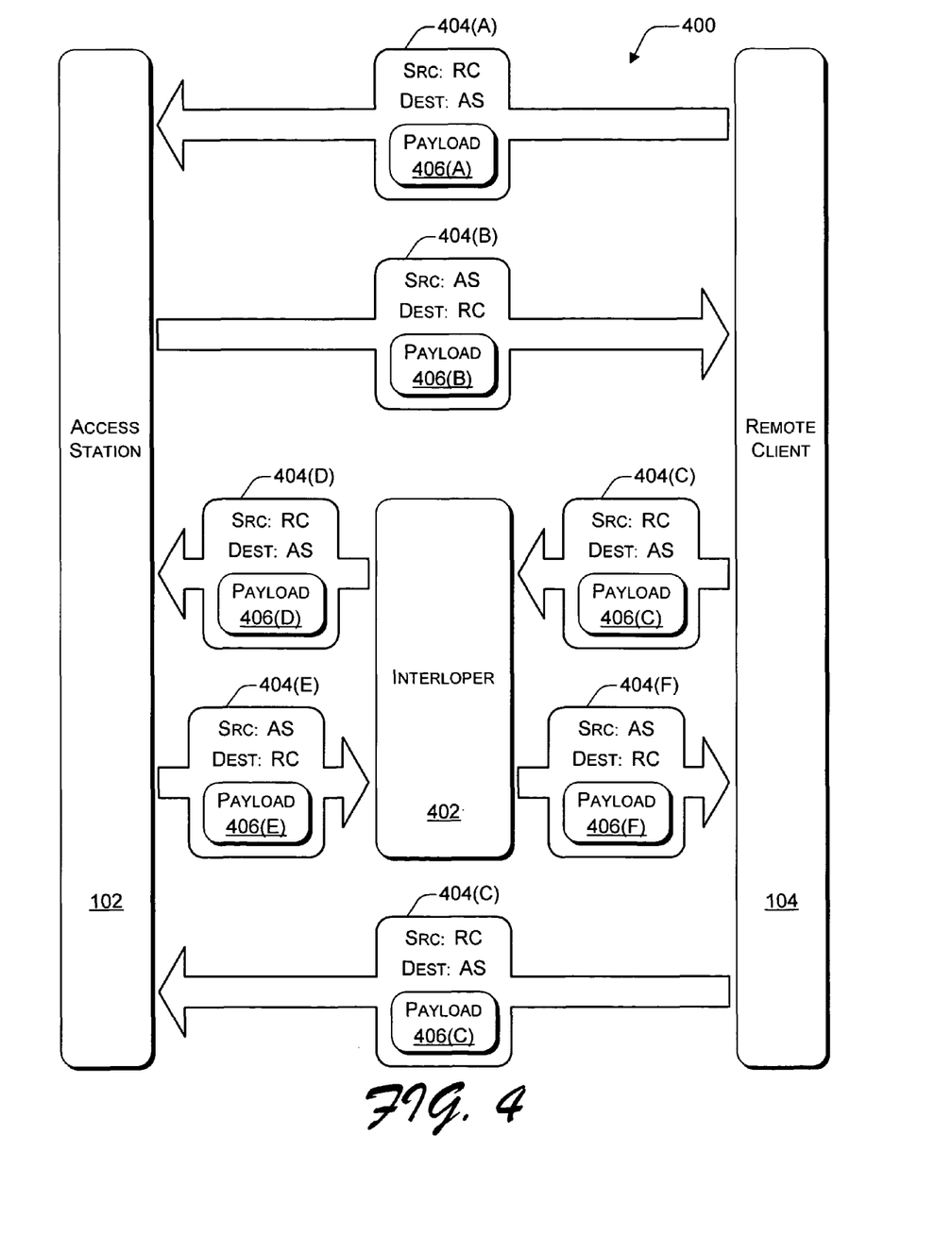
FIG. 4 illustrates an exemplary wireless communications exchange involving an access station, a remote client, and an interloper that transceive packets.

FIG. 4 illustrates an exemplary wireless communications exchange 400 involving an access station 102, a remote client 104, and an interloper 402 that transceive packets 404. Each packet 404 is transmitted from a first entity and received at a second entity (i.e., transceived or exchanged therebetween).

Packets 404 are propagated across the wireless medium as a wireless communication, a communications link, and/or as a communications signal.

Each packet 404 includes a source address and a destination address as well as a payload 406. The source address is intended to identify the entity transmitting packet 404 and the destination address identifies the intended recipient. Addresses may identify an entity on a transient basis or on a permanent basis.

In a described implementation, an address for remote client 104 is assigned on a temporary basis by access station 102, and an address for access station 102 is selected for relatively indefinite use. Moreover, the addresses for remote clients 104 may be medium access control (MAC) addresses in accordance with certain IEEE 802.11 provisions. Other exemplary address types are described below with reference to FIG. 8. The address for access station 102 may be negotiated or otherwise agreed upon by the access station 102 and other access points proximate thereto in certain IEEE 802.11 wireless communication environments.

As illustrated, packet 404(A) has a source address of "RC" (for remote client 104) and a destination address of "AS" (for access station 102). Packet 404(A) includes a payload 406 (A). Packet 404(A) is successfully transceived between remote client 104 and access station 102. Conversely, packet 404(B) has a source address of "AS" and a destination address of "RC". Packet 404(B) includes a payload 406(B). Packet 404(B) is successfully transmitted from access station 102 and received at remote client 104. Thus, packets 404(A) and 404(B) are not hi-jacked, inspected, interfered with, or otherwise impacted by interloper 402.

However, packet 404(C) is impacted by interloper 402. Packet 404(C) has a source address of "RC" and a destination address of "AS". Packet 404(C) includes a payload 406(C). As illustrated near the bottom of wireless communications exchange 400, packet 404(C) is transmitted from remote client 104 and successfully received at access station 102. As illustrated near the middle of wireless communications exchange 400, packet 404(C) is also intercepted by interloper 402. Although illustrated separately, packet 404(C) likely emanates from remote client 104 once and from one location.

Interloper 402 (e.g., a MITM) hi-jacks packet 404(C) in the uplink direction. For example, interloper 402 retransmits packet 404(C) as packet 404(D). Packet 404(D) has a source address of "RC" and a destination address of "AS". Packet 404(D) includes a payload 406(D). Thus, interloper 402 impersonates remote client 104 to spoof access station 102 and has the opportunity to modify payload 406(C) to produce payload 406(D), especially if payload 406(C) is not encrypted or otherwise protected. Packet 404(D) is transmitted from interloper 402 and received at access station 102.

Interloper 402 may also hi-jack packets 404 in the downlink direction. For example, interloper 402 retransmits packet 404(E) as packet 404(F). Packets 404(E) and 404(F) have a source address of "AS" and a destination address of "RC". Packet 404(E) includes a payload 406(E), and packet 404(F) includes a payload 406(F). Thus, interloper 402 may impersonate access station 102 to spoof remote client 104 and has the opportunity to modify payload 406(E), as well as possibly to block reception of packet 404(E) by remote client 104.

Packet 404(E) is transceived between access station 102 and interloper 402 (because packet 404(E) is intercepted by interloper 402). Packet 404(F) is transmitted from interloper 402 and received at remote client 104. Although not explicitly shown, packet 404(E) may also be received "directly" from access station 102 at remote client 104 (and therefore in an unmodified form).

Payload 406(D) of packet 404(D) may differ from payload 406(C) of packet 404(C). In other words, interloper 402 may hijack the payload 406(C) that remote client 104 is attempting to communicate to access station 102, modify it, and then forward the alternative payload 406(D). Similarly, payload 406(F) of packet 404(F) may differ from payload 406(E) of packet 404(E).

Various permutations are possible with respect to which packets 404 reach which intended destination and at what times. For example, a packet 404 that is sent from remote client 104 toward access station 102 may reach only access station 102, only interloper 402, both access station 102 and interloper 402, and so forth. Similarly, a packet 404 that is sent from access station 102 toward remote client 104 may reach only remote client 104, only interloper 402, both remote client 104 and interloper 402, and so forth. Also, packet 404(D) may arrive at access station 102 from interloper 402 while packet 404(C) is arriving from remote client 104, after packet 404(C) has been fully received at access station 102, and so forth. Other permutations are additionally possible.

Regardless, because packets 404 from remote client 104 are identified by the source address, access station 102 cannot automatically detect that packet 404(D) is from interloper 402. Furthermore, access station 102 may not have the information and/or the capability to detect that packet 404(D) is from interloper 402 based on payload 406(D).

Figure 5:
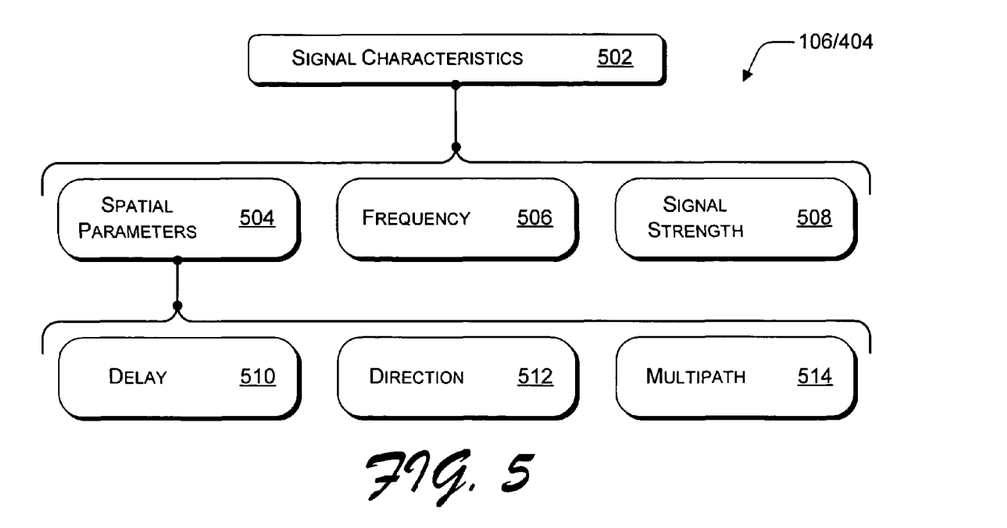
FIG. 5 illustrates exemplary signal characteristics for a communications link and/or a propagated packet.

As noted above, interloper 402 may impersonate remote client 104 to spoof access station 102, and/or interloper 402 may impersonate access station 102 to spoof remote client 104. In the latter case, the address "AS" that is used by interloper 402 may also be the address of an access station 102 that has multiple pointing directions (e.g., as established by multiple communication beams 202 as shown in FIGS. 2 and 3) and may be the actual address of an interloping detection mechanism (as described further herein). In other words, an interloping detection mechanism or a beamforming access device thereof may be the signal source or communications exchange participant that interloper 402 is imitating FIG. 5 illustrates exemplary signal characteristics 502 for a communications link 106 and/or a propagated packet 404. Signal characteristics 502 are those characteristics that may be ascertained by a receiver with regard to a signal (e.g., a wireless communication or communications link 106, a propagated packet 404, etc.). Signal characteristics 502 include, for example, one or more spatial parameters 504, a frequency 506, a signal strength 508, etc. with regard to a given signal.

Frequency 506 corresponds to a frequency at which the signal is received, and signal strength 508 corresponds to a signal strength at which the signal is received. Both frequency 506 and signal strength 508 are somewhat difficult to precisely duplicate as an interloper 402. An example for frequency 506 is presented below with particular reference to FIG. 10.

Spatial parameters 504 can be even more difficult to impersonate as an interloper 402. Spatial parameters 504 include, for example, a delay 510, a direction 512, a multipath (offset) 514, etc. with regard to the given signal. Delay 510 corresponds to a delay at which the given signal is received with respect to an expected arrival time. An example for delay 510 is presented below with particular reference to FIG. 10.

Direction 512 and multipath 514 may be ascertained especially in environments with access stations 102 that include wireless I/O units 206 that produce multiple communication beams 202. Direction 512 is ascertained responsive to on which commication beam 202 of multiple communication beams 202(0 ... m) a signal is received. For example, if thirteen communication beams 202(0 ... 13) are receiving signals at an access station 102, direction 512 for a given signal may take one of thirteen values.

Multipath 514 is ascertained responsive to on which communication beam 202 of multiple communication beams 202(0 ... m) a multipath ray or version of a given signal is received. For example, if thirteen communication beams 202(0 ... 13) are receiving signals at an access station 102, multipath 514 for a given signal may take one of twenty-five values depending on which communication beam 202 a multipath ray of the given signal is received. With thirteen communication beams 202(0 ... 13) a secondary multipath ray may be +12 to 0 to −12 communication beams 202 removed from the communication beam 202 of the primary ray. Examples for direction 512 and multipath 514 are presented below with particular reference to FIGS. 7 and 10.

Figure 6:
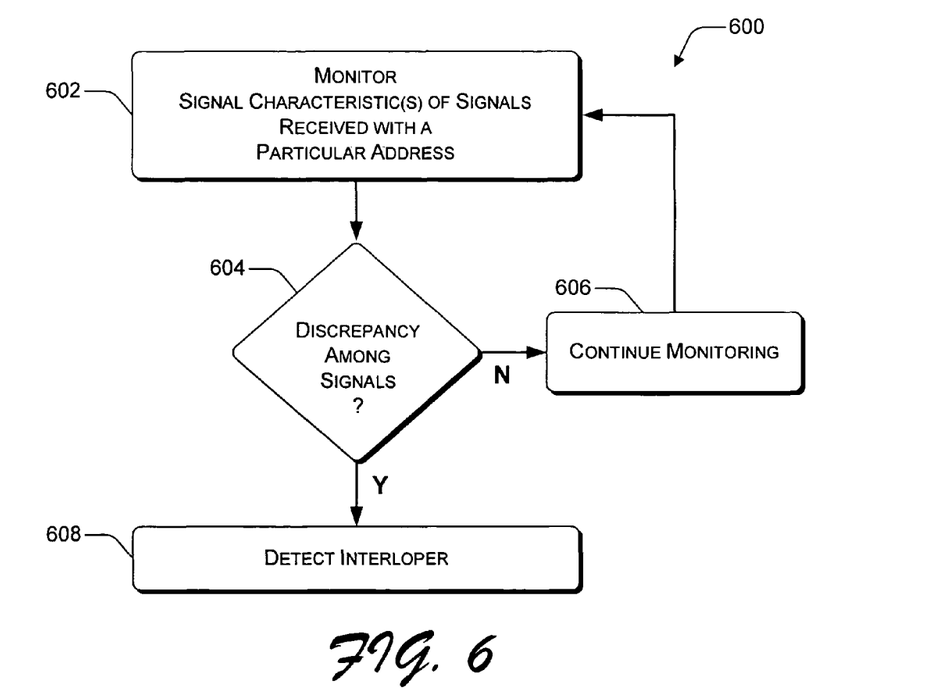
FIG. 6 is a flow diagram that illustrates an exemplary method for detecting a wireless interloper.

FIG. 6 is a flow diagram 600 that illustrates an exemplary method for detecting a wireless interloper. Flow diagram 600 includes four (4) blocks 602-608. The actions of flow diagram 600 may be performed, for example, by an access station (e.g., an access station 102 of FIGS. 1, 2, 4, etc.), and exemplary explanations of these actions are provided with reference thereto.

At block 602, signal characteristic(s) of signals that are received and have a particular address are monitored. For example, one or more signal characteristics 502 of wireless communication signals 106 that relate to a single address and that are received at an access station 102 from a remote client 104 (and possibly an interloper 402) may be monitored.

At block 604, it is determined if a discrepancy exists among the signals (including between two signals). For example, it may be determined if there is a discrepancy between one or more signal characteristics of signal characteristics 502 for multiple signals 106 that relate to a single address. If no discrepancy is determined to exist (at block 604), then the monitoring is continued at block 606. If, on the other hand, a discrepancy is determined to exist (at block 604), then an interloper is detected at block 608. For example, access station 102 may detect an interloper 402 that is hi-jacking from remote client 104 an address assigned thereto.

Figure 7:
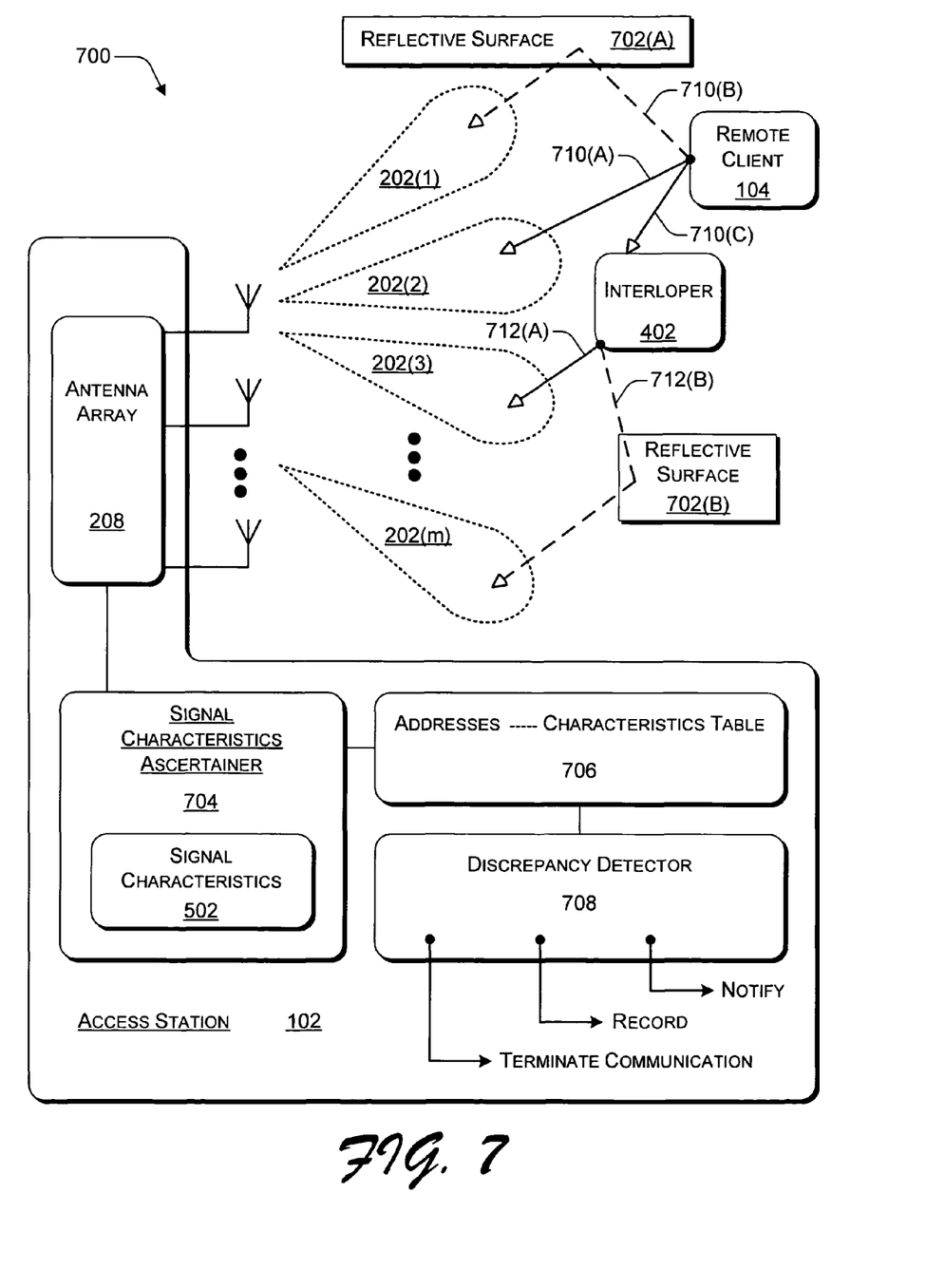
FIG. 7 illustrates a wireless communications environment including an exemplary access station that is capable of detecting and countering an attack by a wireless interloper.

FIG. 7 illustrates a wireless communications environment 700 including an exemplary access station 102 that is capable of detecting and countering an attack by a wireless interloper 402. Access station 102 produces multiple communication beams 202(1), 202(2), 202(3) ... 202(m) to establish a wireless coverage area (not separately designated). A remote client 104 and interloper 402 are at least partially "within" or otherwise "have access to" this wireless coverage area.

Access station 102 includes antenna array 208 that produces communication beams 202(1 ... m) in conjunction with a beamformer (not explicitly shown in FIG. 7). Access station 102 also includes a signal characteristics ascertainer 704, an addresses-characteristics table 706, and a discrepancy detector 708. Signal characteristics ascertainer 704, addresses-characteristics table 706, and/or discrepancy detector 708 may comprise part of wireless I/O unit 206, for example.

Signal characteristics ascertainer 704 is coupled (directly or indirectly) to antenna array 208 to receive incoming signals. Although not shown, signal characteristics ascertainer 704 may also be part of or coupled to a beamformer, a signal processor or transceiver, baseband logic, another receiver path portion, some combination thereof, and so forth. Signal characteristics ascertainer 704 comprises logic to ascertain one or more signal characteristics 502 for each signal of the received incoming signals.

The ascertained signal characteristics for the incoming signals are forwarded from signal characteristics ascertainer 704 to addresses-characteristics table 706 for storage in association with the source addresses of the incoming signals. For example, for each incoming signal that is received and that relates to a particular source address, the ascertained signal characteristics thereof are stored together in association with that particular source address. An exemplary addresses-characteristics table 706 is described further below with reference to FIG. 8.

Discrepancy detector 708 analyzes the signal characteristics stored at addresses-characteristics table 706 for each particular source address. This analysis is performed to determine whether a discrepancy exists in the stored signal characteristics for a particular source address. If so, an attack by a wireless interloper with respect to that particular source address is detected. Exemplary options for countering the attack by the wireless interloper are described further below both in general and in the context of wireless communications environment 700.

Wireless communications environment 700 has a coverage area defined by communication beams 202(1 ... m). Within or affecting communication within this coverage area are reflective surfaces 702(A) and 702(B). Reflective surfaces 702 may be cars, buildings, and so forth. Wireless communications within the coverage area may be reflected from these reflective surfaces 702.

Signals 710 and 712 are being transmitted, received, propagated, and/or reflected within the wireless coverage area. Specifically, remote client 104 is transmitting signal 710, and interloper 402 is transmitting signal 712. Signals 710 and 712 may be comprised of all or part of one or more packets 404 in a digital wireless communications environment 700.

Signal 710 emanates from remote client 104 at a multitude of angles or rays. "Primary" signal ray 710(A) is received by the intended destination, which is access station 102, at communication beam 202(2). Signal 710 is also received, or intercepted, by interloper 402 via signal ray 710(C). Furthermore, signal 710 is also received by access station 102 at communication beam 202(1) as a multipath signal ray 710(B) that has been reflected off of reflective surface 702(A). Other unillustrated signals rays (e.g., from bleedover, multipath, etc.) for signal 710 may also be present.

In a described example, interloper 402 uses the source address of remote client 104, as intercepted from signal ray 710(C), for the signal 712. Signal 712 emanates from interloper 402 at a multitude of angles or rays. "Primary" signal ray 712(A) is received by its intended destination, which is access station 102, at communication beam 202(3). Signal 712 is also received by access station 102 at communication beam 202(m) as a multipath signal ray 712(B) that has been reflected off of reflective surface 702(B).

After or while receiving signals 710 and 712 at antenna array 208, signal characteristics ascertainer 704 ascertains one or more signal characteristics 502 for each signal. For signal 710, direction 512 is ascertained to be communication beam 202(2) (e.g., direction #2) because signal ray 710(A) is received thereat. Multipath (offset) 514 is ascertained to be one beam 202 removed from the primary beam because beam 202(1) of multipath signal ray 710(B) is one beam 202 away from beam 202(2) that is receiving signal ray 710(A).

For signal 712, direction 512 is ascertained to be communication beam 202(3) (e.g., direction #3) because signal ray 712(A) is received thereat. Multipath 514 is ascertained to be "k" beams 202 (where k=m−3) removed from the primary beam because beam 202(*m*) of multipath signal ray 712(B) is k beams 202 away from beam 202(3) that is receiving signal ray 712(A).

The value of multipath 514 may also be denoted as being positive or negative, depending on the orientation at which the multipath signal ray is being received with respect to the primary signal ray. For example, multipath 514 for signal 710 may be negative one (−1), and multipath 514 for signal 712 may be positive k (+k).

The signal characteristics 502 for each of signals 710 and 712 are stored in addresses-characteristics table 706 in association with a single source address. Discrepancy detector 708 can then analyze the stored signal characteristics for the single source address. In this example, discrepancy detector 708 detects a discrepancy at least between the different directions 512 and multipaths 514 for the single source address. Thus, discrepancy detector 708 has detected the presence of an interloper 402.

Discrepancy detector 708 can also take measures to counter interloper 402. For example, discrepancy detector 708 is enabled to (i) notify, (ii) record, (iii) terminate a communication, (iv) some combination thereof, and so forth. Discrepancy detector 708 may notify an administrator or operator of access station 102 when an interloper is detected. Discrepancy detector 708 may also record (e.g., relatively permanently in non-volatile memory) for subsequent further consideration the signal characteristics 502 for signals 710 and 712 that have different characteristics but the same source address. The payloads 406 of packets 404 for signals 710 and 712 may also be recorded. Furthermore, discrepancy detector 708 may terminate the communication of signals 710 and 712 that have the single source address.

Although interloper detection and countering is described herein primarily in the context of an access station 102, it may alternatively be implemented by a remote client 104 or any receiver generally that is capable of ascertaining one or more signal characteristics 502 of a given signal.

Figure 8:
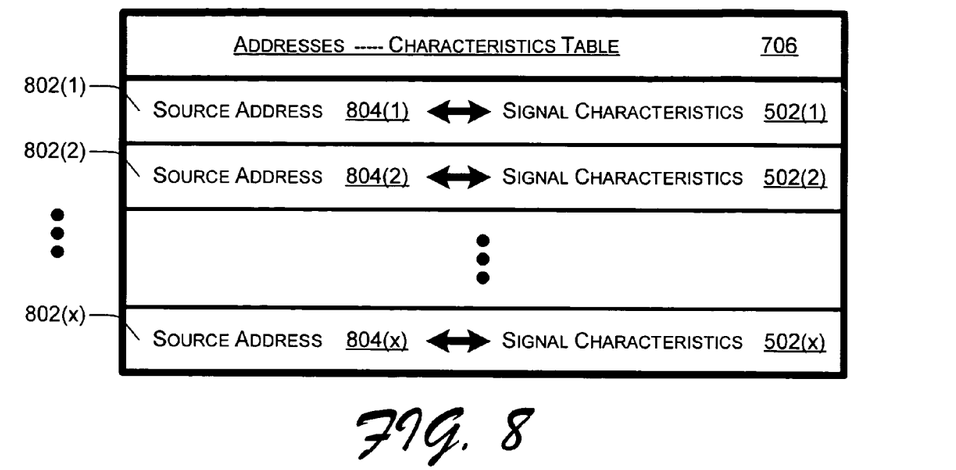
FIG. 8 is an exemplary table as shown in FIG. 7 that links addresses to signal characteristics.

FIG. 8 is an exemplary table 706 as shown in FIG. 7 that links addresses to signal characteristics. In a described implementation, addresses-to-characteristics table 706 includes multiple entries 802(1), 802(2) . . . 802(*x*). Each respective entry 802(1), 802(2) . . . 802(*x*) corresponds to a respective source address 804(1), 804(2) . . . 804(*x*). Addresses-to-characteristics table 706 may be realized in memory as any general or specific data structure.

Each respective source address 804(1), 804(2) . . . 804(*x*) has stored in association therewith respective signal characteristics 502(1), 502(2) . . . 502(*x*). Hence, each entry 802(1), 802(2) . . . 802(*x*) links a respective source address 804(1), 804(2) . . . 804(*x*) to those signal characteristics 502(1), 502(2) . . . 502(*x*) that have been ascertained from respective signals received with those respective source address 804(1), 804(2) . . . 804(*x*). For example, for each packet 404 that is received having source address 804(2), the ascertained signal characteristics thereof are added to signal characteristics 502(2) at entry 802(2).

As noted above, addresses (such as those of a source address 804) may comprise MAC addresses in accordance with one or more IEEE 802.11 standards. Other address type examples include, without limitation, an extended service set identifier (ESSID), an internet protocol (IP) address, and so forth. ESSIDs, for example, may be naturally re-used within a system in a normal deployment mode. In these situations, an interloping detection mechanism keeps track of the addresses and signal characteristics of the devices that are known not to be interlopers, and duplicate (or triplicate, etc.) addresses with new signal characteristics are acted upon by the interloping detection mechanism as potentially originating from interloping devices. For instance, if two remote clients 104 use the same ESSID during normal operation, and this information along with associated signal characteristics are stored for the interloping detection mechanism, then the discovery of an ESSID with different signal characteristics may be used to detect an interloper.

Figure 9:
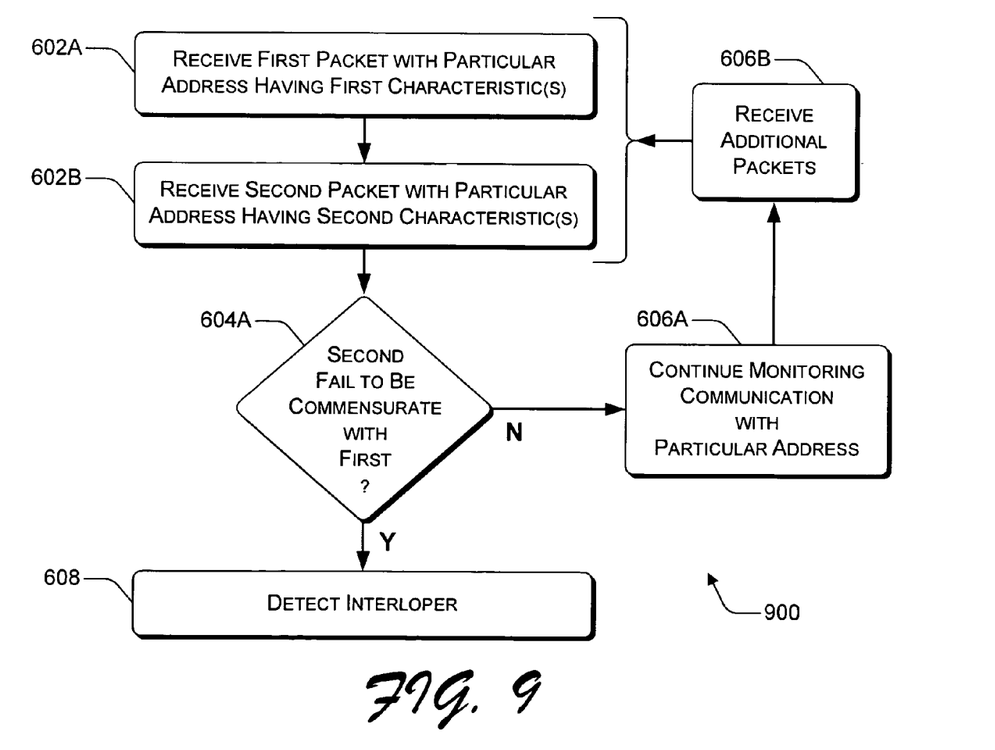
FIG. 9 is a flow diagram that illustrates another exemplary method for detecting a wireless interloper.

FIG. 9 is a flow diagram 900 that illustrates another exemplary method for detecting a wireless interloper. Flow diagram 900 includes six (6) blocks 602A, 602B, 604A, 606A, 606B, and 608. The actions of flow diagram 900 may be performed, for example, by an access station (e.g., an access station 102 of FIGS. 1, 2, 4, 7, etc. having an addresses-to-characteristics table 706), and exemplary explanations of these actions are provided with reference thereto.

At block 602A, a first packet with a particular address having first characteristic(s) is received. For example, a packet 404 of a signal 710 with a source address 804 for remote client 104 may be received having one or more first signal characteristics 502-1. At block 602B, a second packet with the particular address having second characteristic(s) is received. For example, a packet 404 of a signal 712 with the source address 804 of remote client 104 may be received having one or more second signal characteristics 502-2.

At block 604A, it is determined if the second characteristic(s) fail to be commensurate with the first characteristic(s). For example, it may determined if second signal characteristics 502-2 fail to be commensurate with first signal characteristics 502-1. It should be understood that some deviation in signal characteristics 502 from one packet 404-1 to another packet 404-2 is to be expected in a wireless communications environment, even if the two different packets 404-1 and 404-2 originate from the same transmitter.

If the second characteristic(s) do not fail to be commensurate with the first characteristic(s) (as determined at block 604A), then at block 606A communications with the particular address continue to be monitored. At block 606B, additional packets with the particular address are received and monitored. If, on the other hand, the second characteristic(s) do fail to be commensurate with the first characteristic(s) (as determined at block 604A), then at block 608 an interloper is detected.

Figure 10:
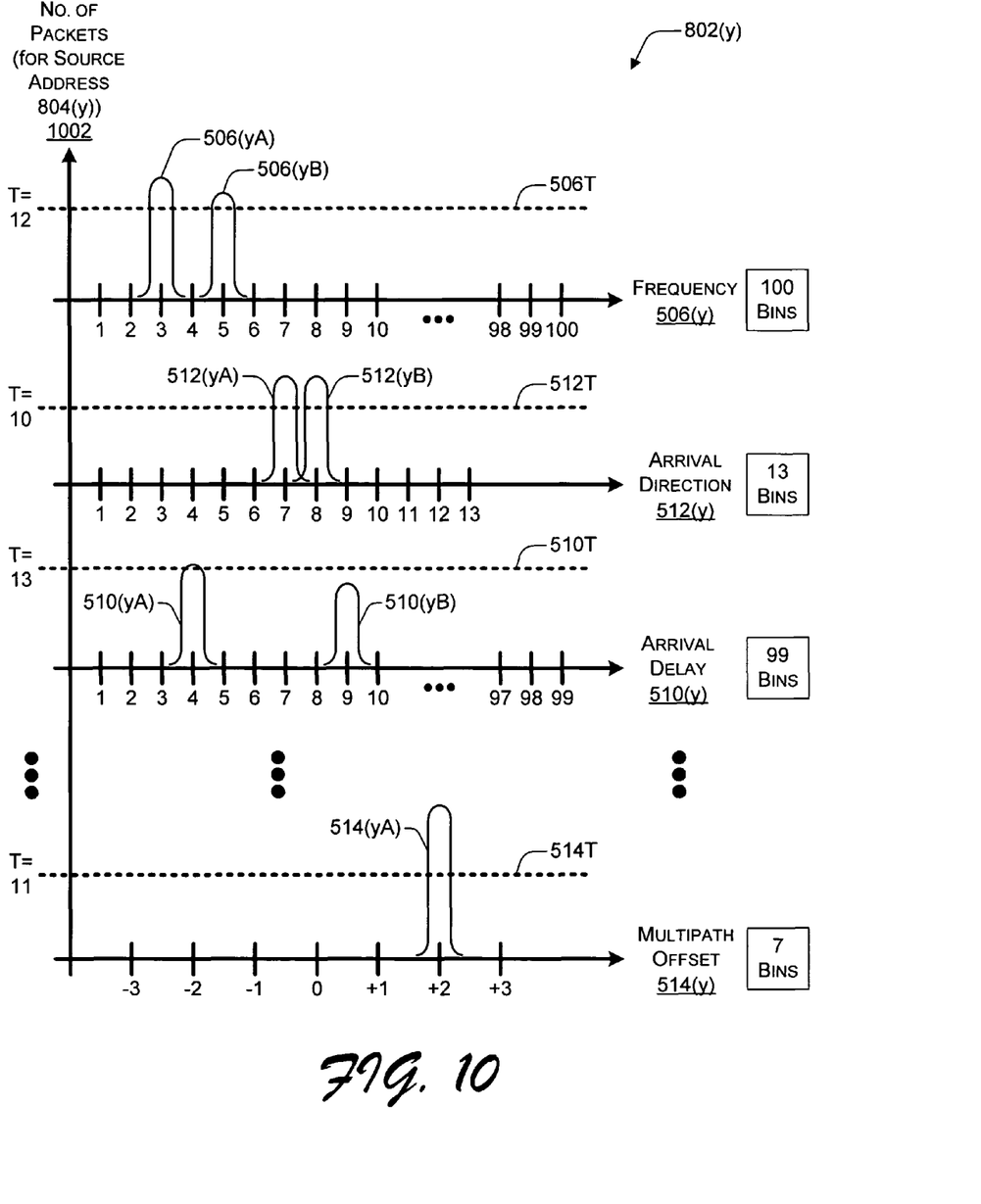
FIG. 10 illustrates an exemplary signal characteristics entry, which corresponds to a particular address, for an address-to-signal characteristics table as shown in FIG. 8.

FIG. 10 illustrates an exemplary signal characteristics entry 802(*y*), which corresponds to a particular address 804(*y*), for an address-to-signal characteristics table 706 as shown in FIG. 8. Signal characteristics entry 802(*y*) corresponds to a source address 804(*y*). Signal characteristics entry 802(*y*) includes a vertical axis 1002 that represents the number of packets received that have source address 804(*y*) for any one or more signal characteristics 502.

As illustrated, signal characteristics entry 802(*y*) includes a frequency 506(*y*), an arrival direction 512(*y*), an arrival delay 510(*y*) . . . a multipath offset 514(*y*). However, each signal characteristics entry 802 may include one or more signal characteristics of signal characteristics 502 in any combination. Each of the individual signal characteristics has a corresponding horizontal axis, which represents available values for the individual signal characteristics, and at least one threshold.

In a described implementation, frequency 506(*y*) has a range of values 100 kHz wide in 1 kHz increments. This equates to 100 available values or bins to which each packet 404 may be assigned or allocated. Frequency 506(*y*) also has a corresponding threshold 506T. In the illustrated example, a first packet tally 506(*y*A) corresponds to bin #3, and a second packet tally 506(*y*B) corresponds to bin #5. For frequency

506(y), a bi-modal distribution is present because two packet tallies 506(yA) and 506(yB) exceed threshold 506T.

Arrival direction 512(y) has a range of values that depend on the number of communication beams 202(0 ... m). In the illustrated example, m=13, so there are 13 available values or bins to which each packet 404 may be assigned. Arrival direction 512(y) also has a corresponding threshold 512T. A first packet tally 512(yA) corresponds to bin #7, and a second packet tally 512(yB) corresponds to bin #8. For arrival direction 512(y), a bi-modal distribution is present because two packet tallies 512(yA) and 512(yB) exceed threshold 512T.

Arrival delay 510(y) has a range of values e.g. 99 nanoseconds wide (or long) in 1 nanosecond increments. This equates to 99 available values or bins to which each packet 404 may be assigned. Arrival delay 510(y) also has a corresponding threshold 510T. A first packet tally 510(yA) corresponds to bin #4, and a second packet tally 510(yB) corresponds to bin #9. For arrival delay 510(y), a bi-modal distribution is not present because only one packet tally 510(yA) (of two packet tallies 510(yA) and 510(yB)) exceed threshold 510T.

Multipath offset 514(y) has a range of values across 7 total beam spacings from −3 to +3 in 1 beam increments for multipath rays. This equates to 7 available values or bins to which each packet 404 may be assigned. However, 25 different beam spacings, including no beam spacing (0), may alternatively be logged for a system with 13 communication beams 202(0 ... 13). Multipath offset 514(y) also has a corresponding threshold 514T. A packet tally 514(yA) corresponds to bin #+2. For multipath offset 514(y), a bi-modal distribution is not present because only one packet tally 514(yA) for one bin has been logged.

As illustrated, threshold 506T is equal to 12 packets, and threshold 512T is equal to 10 packets. Also, threshold 510T is equal to 13 packets, and threshold 514T is equal to 11 packets. Alternatively, two or more (including all) thresholds may be set to the same number of packets 404.

As indicated above, a bi-modal distribution is considered to be present for any given signal characteristic 502 when two different bins are both filled to (including beyond) a predetermined threshold. In other words, in a described implementation, an interloper 402 is detected when a bi-modal distribution is present for any one or more signal characteristics of signal characteristics 502. Alternatively, two, three, or more different signal characteristics may have bi-modal distributions before an interloper 402 is deemed to be detected.

Figure 11:
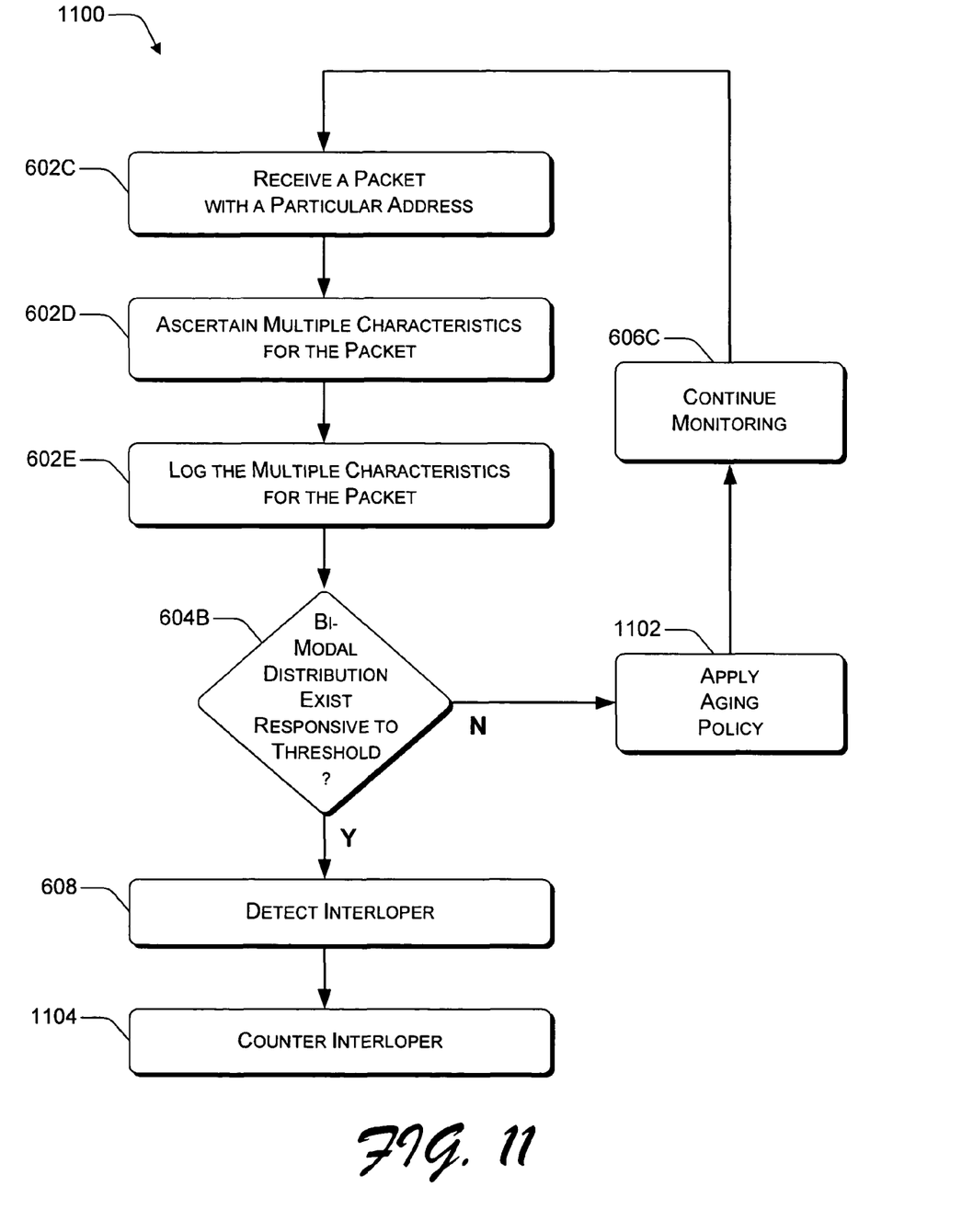
FIG. 11 is a flow diagram that illustrates an exemplary method for detecting and countering a wireless interloper.

FIG. 11 is a flow diagram 1100 that illustrates an exemplary method for detecting and countering a wireless interloper. Flow diagram 1100 includes eight (8) blocks 602C, 602D, 602E, 604B, 606C, 608, 1102, and 1104. The actions of flow diagram 1100 may be performed, for example, by an access station (e.g., an access station 102 of FIGS. 1, 2, 4, 7, 8, 10, etc.), and exemplary explanations of these actions are provided with reference thereto.

At block 602C, a packet is received with a particular address. For example, a packet 404 having a source address 804 is received on a signal 710/712 at an access station 102. At block 602D, multiple characteristics for the packet are ascertained. For example, a signal characteristics ascertainer 704 may ascertain one or more signal characteristics 502 of packet 404. At block 602E, the ascertained multiple characteristics for the packet are logged. For example, signal characteristics 502 for packet 404 may be stored in an addresses-characteristics table 706 at an entry 802 corresponding to source address 804.

At block 604B, it is determined if a bi-modal distribution exists responsive to a predetermined threshold for packets arriving with the particular address. For example, it may be determined if two different packet tallies for at least one signal characteristic 502 exceed a pre-selected threshold. If no bi-modal distribution exists (as determined at block 604B), an aging policy is applied at block 1102.

An aging policy is used to ensure that packets of the packet tallies are maintained to be relatively recent. An aging policy may be applied based on time, based on a number of packets, some combination thereof, and so forth. For example, any packet 404 that was received more than a pre-determined period of time in the past may be removed from the bins of a given signal characteristic 502. In other words, a packet filter with a decaying time constant may be applied to each signal characteristics entry 802 of addresses-to-characteristics table 706.

Alternatively, when the number of packets 404 that have been logged in an entry 802 exceeds a predetermined number, then the oldest packet 404 is jettisoned. For instance, a packet total for a given signal characteristic 502 may be limited to 2.5 times the corresponding threshold level. After the aging policy is applied (at block 1102), monitoring may be continued at block 606C.

If, on the other hand, a bi-modal distribution does exist responsive to the predetermined threshold (as determined at block 604B), an interloper is detected at block 608. For example, if a discrepancy detector 708 determines that a bi-modal distribution is present at signal characteristics entry 802 of addresses-characteristics table 706, discrepancy detector 708 may deem that an interloper 402 has been detected with regard to the source address 804 corresponding to that entry 802.

An interloper 402 may be deemed to have been detected under a variety of situations. For example, an interloper 402 may be detected when any one signal characteristic of signal characteristics 502 presents a bi-modal distribution responsive to the threshold of that signal characteristic. Alternatively, an interloper 402 may be detected when any two, three, or more signal characteristics of signal characteristics 502 present a bi-modal distribution responsive to their respective thresholds.

Certain signal characteristics of signal characteristics 502 may be a better indicator of an interloper 402 in a particular environment than other signal characteristics. Consequently, one signal characteristic may be sufficient alone as an interloper detector while two other signal characteristics need to jointly present a bi-modal distribution before an interloper is deemed to be detected.

Setting the number of signal characteristics that present a bi-modal distribution before an interloper 402 is deemed to be detected is one scheme for modulating a false alarm rate. Another scheme is changing the threshold level for an individual or for all signal characteristics of signal characteristics 502. Thus, an operator of an access station 102 may set a false alarm rate for detecting wireless interlopers.

Yet another scheme for modulating the false alarm rate is requiring a bi-modal distribution to be presented twice for a given source address 804. Thus, after a bi-modal distribution is determined to exist once for a particular signal characteristic, packet tallies are cleared for that signal characteristic (and possibly for all signal characteristics 502 for a given source address 804). An interloper 402 is deemed to be detected if that particular signal characteristic (and possibly any other signal characteristic of signal characteristics 502) again presents a bi-modal distribution.

After an interloper is detected (at block 608), the interloper is countered at block 1104. For example, discrepancy detector 708 (or another component of access station 102) may (i) notify an administrator, (ii) record the packet tallies for the bi-modal distribution signal characteristic or multiple signal characteristics (and possibly payloads 406 of packets 404 as well), (iii) terminate communications having the source address 804, and so forth.

These interloper countermeasures may also be employed in a multi-level approach. For instance, detection of a first bi-modal distribution may cause a notification and/or a recordation countermeasure to be invoked. After clearing the packet tallies, detection of a second bi-modal distribution may cause a communication termination countermeasure to be invoked. Other combinations of interloper detection and countering may alternatively be employed.

The diagrams of FIGS. 1-11 are illustrated as blocks representing features, devices, logic, components, functions, actions, some combination thereof, and so forth. However, the order and/or layout in which the diagrams are described and/or shown is not intended to be construed as a limitation, and any number of the blocks (or portions thereof) can be combined, augmented, omitted, and/or re-arranged in any order to implement one or more methods, systems, apparatuses, access stations, arrangements, schemes, approaches, etc. for detecting wireless interlopers.

Furthermore, although the description herein includes references to specific hardware-oriented implementations such as those of FIGS. 2, 3, 4, 7, 8, and 10 (as well as the exemplary general environment of FIG. 1), the features, logic, components, functions, etc. thereof as well as the actions of FIGS. 6, 9, and 11 can be implemented in any suitable hardware, software, firmware, or combination thereof and using any suitable coding/logical mechanism(s), address/identification paradigm(s), radio frequency technology, and so forth.

By way of example only, the blocks of FIGS. 1-11 (e.g., the components of FIG. 7 and/or the actions of FIGS. 6, 9, and 11) may be implemented fully or partially as one or more processors and/or as one or more media. Such processors may be general purpose microprocessors, special-purpose digital signal processors, some combination thereof, and so forth. Such media may be transmission or storage media, volatile or non-volatile memory, programmable or hard-wired coding, some combination thereof, and so forth. Furthermore, the media may include processor-executable instructions that one or more associated processors are capable of executing.

Although methods, systems, apparatuses, access stations, arrangements, schemes, approaches, and other implementations have been described in language specific to structural and functional features and/or flow diagrams, it is to be understood that the invention defined in the appended claims is not necessarily limited to the specific features or flow diagrams described. Rather, the specific features and flow diagrams are disclosed as exemplary forms of implementing the claimed invention.

The invention claimed is:

1. An apparatus comprising
   at least one processor;
   at least one antenna array for transceiving a plurality of communication beams;
   one or more media comprising processor-executable instructions that are capable of being executed by said at least one processor, the processor-executable instructions adapted to direct the apparatus to perform steps comprising:
      receiving a plurality of communication beam packets via at least one communication beam with said antenna array, each communication beam packet comprising a single source address;
      monitoring at least one received-signal-characteristic, representative of propagated arrivals at a single antenna array, for a plurality of said packets that relate to a single source address; and
      detecting a wireless interloper if a discrepancy is determined to exist with regard to said at least one received-signal-characteristic relating to a single source address propagated to said single antenna array of the apparatus.

2. An apparatus according to claim 1 wherein the detecting step is performed without requiring additional receiving, monitoring, detecting, or location-triangulating assistance from other apparatus nodes in a network.

3. An apparatus according to claim 1 wherein the monitoring step for a plurality of packets related to a single source address comprises:
   logging and updating at least one received-signal-characteristic selected from the group comprising: arrival delay, arrival direction, offset in arrival directions for multipath, carrier frequency offset, and direction-indexed path signal strength.

4. An apparatus according to claim 3 using a histogram to represent the quantized distribution of at least one received signal characteristic.

5. An apparatus according to claim 4 wherein the height of a histogram bin indicates the number of occurrences that a quantized received-signal-characteristic falls into that bin.

6. An apparatus according to claim 5 wherein a binned occurrence is removed when it ages beyond a preset limit.

7. An apparatus according to claim 1 wherein the detecting step further comprises:
   detecting whether the distribution of one or more received-signal-characteristics monitored over a first plurality of packets is commensurate with that monitored over a second plurality of packets and whether said second plurality of packets is not identical to said first plurality of packets.

8. An apparatus according to claim 1 wherein the detecting step further comprises:
   determining whether a bi-modal distribution appears, responsive to an alarm threshold, when one or more of said received-signal-characteristics are monitored over a plurality of packets.

9. An apparatus according to claim 1 wherein the processor-executable instructions are adapted to cause the apparatus to perform the further step of: if a wireless interloper is detected in the detecting action, countering the interloper.

* * * * *